Jan. 26, 1960     H. HOFBAUER     2,922,452
EVER-READY CASE FOR PHOTOGRAPHIC CAMERAS
Filed Oct. 30, 1956     2 Sheets-Sheet 1
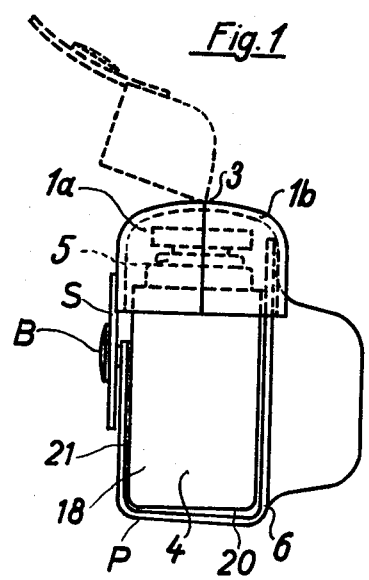
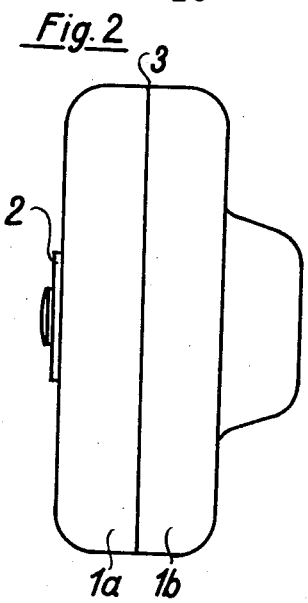
INVENTOR.
HANS HOFBAUER

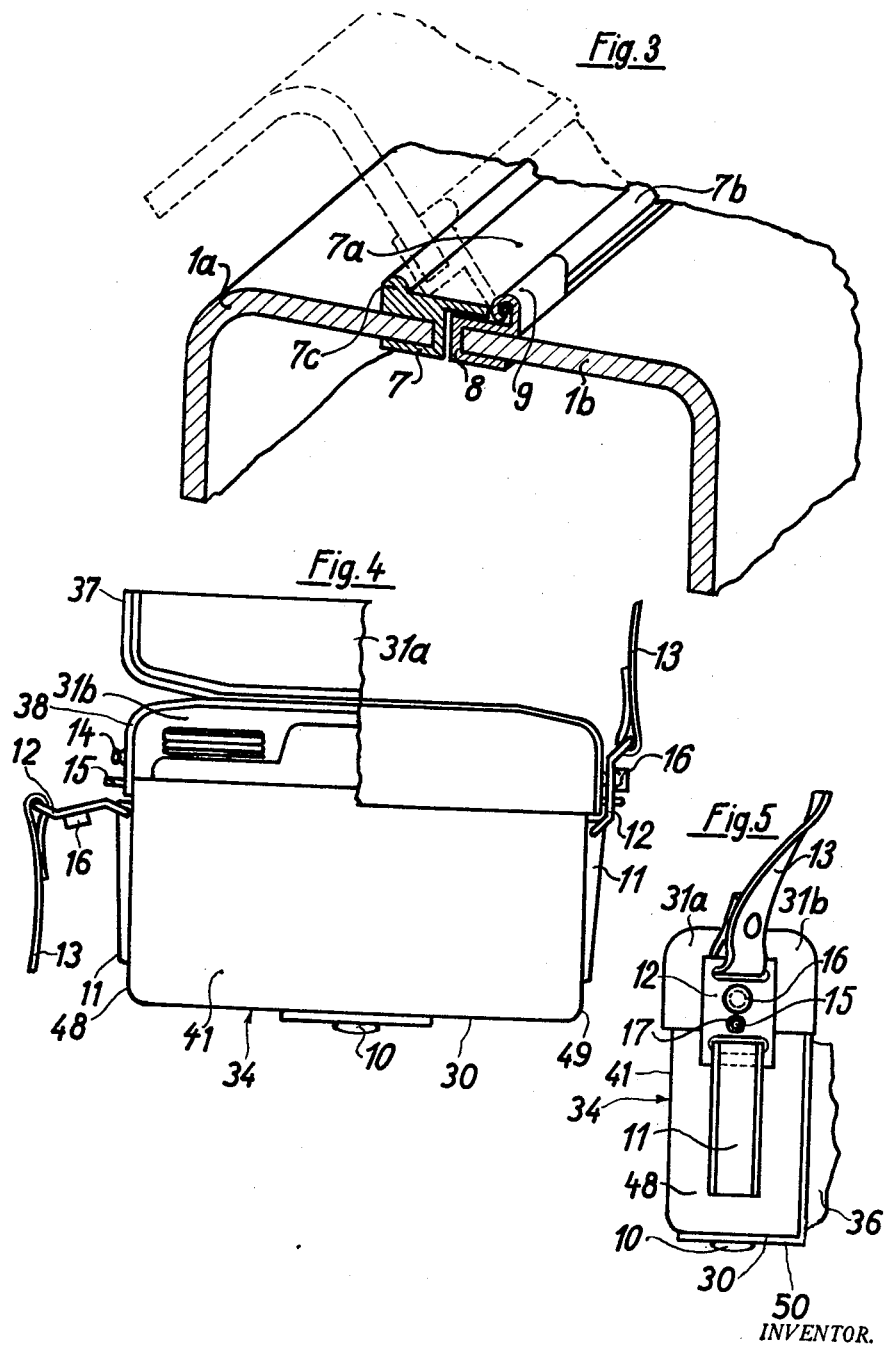

United States Patent Office 2,922,452
Patented Jan. 26, 1960

2,922,452

EVER-READY CASE FOR PHOTOGRAPHIC CAMERAS

Hans Hofbauer, Munich, Germany

Application October 30, 1956, Serial No. 619,266

Claims priority, application Germany December 15, 1955

3 Claims. (Cl. 150—52)

This invention relates to containers for photographic apparatus, particularly cameras. Heretofore such camera cases have been provided with a main case receiving the main part of the camera and which could be closed by a cap covering the top of the camera. Usually this cap has been connected with a flap covering the shutter so that by merely taking off the cap of the case the camera will be ready for use. There will be, however, a difficulty arising from the fact that in spite of the pivotal connection between the cap and the flap covering the shutter, the parts of the camera projecting from the main case, as for example the film winding button, viewing device and range finder, will be scraped by the covering cap, thereby preventing an easy and quick handling of the camera.

It is therefore an object of the invention to provide a camera case in which the cup-like cover, enclosing the top of the camera, consists of at least two parts which are connected by a hinge. Another object of the invention resides in means for preventing humidity and dust from entering the joints formed by the hinged parts. Other objects such as simplicity and adaptability will become apparent from the following description and explanation:

In the drawings which accompany and form a part of this disclosure and in which like numerals and letters of reference denote corresponding parts throughout the several views:

Fig. 1 is a side elevation, and

Fig. 2 is a top plan view of the case,

Fig. 3 is a vertical section on a large scale of a special embodiment of a hinge arranged between the cover-parts, Fig. 4 is a rear elevation of a modified case with the cover partially turned up, and Fig. 5 is a side elevation of the case according to Fig. 4.

Referring to the drawings Fig. 1 shows a longitudinally divided cover 1a, 1b which, on using the camera, can be turned up by first swinging the part 1a about the axis 3, as indicated in dash lines. In this way the parts of the camera projecting from the main body 4 of the case can be exposed and the covers 1a, 1b of the case together with the cover 6 for the shutter or objective can be turned down. Cover 6 is attached to cover portion 1b. As may be seen from Fig. 3, the borders of the cover portions 1a, 1b have clamped on to them the bars 7 and 8 of U-shaped profile; these bars may be either drawn or formed from sheet metal or they may be castings. One of the U-shaped bars—in this case the bar 7—has an enlarged outer leg 7a which, when the case is closed, overlaps the opposite U-shaped bar 8 so that the joint between the U-shaped bars will be completely covered. The other U-shaped bar is provided at its outer leg with a hinge-eyelet 9 which is advantageously arranged at the free longitudinal edge of the bar 8, whereas the other hinge-eyelet 7b is arranged on the enlarged leg 7a, or is integral with it and is hinged to eyelet 9.

Fig. 3 further shows the bar 7 as being formed with a longitudinal welt 7c which has a cross-section corresponding substantially to that of the hinge portions 7b and 9.

In this way, the entire hinge 7, 8 is given the appearance of an ordinary decorative band.

On opening the case the part 1a will pivot about the axis of hinge 7b by means of its U-shaped bar 7 and its enlarged outer leg 7a, and move through the position indicated in dash lines in Fig. 3.

The parts of the camera projecting from the main body 4 of the case are exposed and the camera 5 is ready for operation when the top cover portions 1a and 1b and the shutter cover 6 depend from the main body 4 of the case by way of connecting strap portion P attached to the rear of the main body 4 of the case. When the case is closed, as shown in Fig. 1, a securing flap S, extending from the cover 1a, is attached by fastener B to the connecting strap portion P.

The case includes the main body 4, having side wall parts 18 covering the side walls of the camera, a bottom 20 covering the bottom wall of the camera and rear wall part 21 covering the rear wall of the camera. The case including the main body 4 and the various cover portions thereof may consist of leather or other suitable material.

A carrying strap for the case is indicated in Figs. 4 and 5, each end of the strap being fastened to the respective side wall of the case by suitable attaching means, but is omitted from Figs. 1 and 2 for clarity's sake.

A modified embodiment of the camera case is shown in Figs. 4 and 5. The case is indicated at 34, and it includes a rear cover portion 31a, and a front cover portion 31b, the latter being connected to the cover 36 for the objective. Cover 36 in turn is connected by flexible strap portion 50 and button 10 to the bottom 30 of the case 34, so that parts 31a, 31b and 36 can be turned down. Fig. 4 shows one half of the cover portion 31a in the turned-up position, while the other half is closed. The overlapping of the hinge joint is the same as that shown in Fig. 3. For the purpose of this embodiment, bars 37 and 38 which are of the same cross section as bars 7 and 8 respectively, are formed from end to end as bows conforming to the edges of the cover portions 31a and 31b.

The case includes a main body having side wall parts 48 and 49 respectively covering the side walls of the camera, a bottom 30 covering the bottom wall of the camera and a rear wall part 41 covering the rear wall of the camera.

In order to lock the cover portion 31b in the closed position, hinge plates 12 are pivotally arranged on fittings 11 which in turn are fastened to the side wall parts 48, 49 of the main body. A carrying strap 13 is attached at its ends to plates 12. The ends of the bow-shaped bar 38 of the cover portion 31b respectively carry male snap buttons 14 and pins 15 respectively below buttons 14. Plates 12 are provided respectively with hollow female snap buttons 16 which receive buttons 14, respectively, and plates 12 are respectively formed with apertures 17 (see Fig. 5) through which pins 15 respectively extend when the parts are in the position shown in Fig. 5 and at the right in Fig. 4.

When the closed case is suspended from the carrying straps 13, the plates 12 will be turned up so that male buttons 14 are pressed into female buttons 16, while the pins 15 held in recesses 17 provide additional safety against the opening of the cover portion 31b. With this arrangement the cover portion 31a can be turned up while the companion part 31b is kept locked in its closed position. When plates 12 are turned down to the position shown on the left-hand side of Fig. 4 to disengage the respective buttons 14 and pins 15, the cover portion 31b can be turned down together with the cover 36 so that they depend from bottom 30 of the case. Cover 36 is attached to cover portion 31b.

Having thus described the invention what I claim as new and desire to secure by Letters Patent is:

1. A case for a substantially block-shaped camera having top and bottom walls, two side walls, a rear wall and a front wall formed with an objective, comprising, in combination, a main body having a bottom capable of covering the bottom wall and at least portions of the rear wall and of the two side walls, respectively; a front flap capable of covering at least a portion of the front wall and the objective formed thereat, said front flap being hingedly connected to said main body in the region of the front edge of the bottom thereof for pivotal movement about a first pivot axis which extends in the direction of said front edge; and a cover capable of covering the top wall and surrounding the upper end portions of the rear, front and side walls of the camera, said cover being composed of two cover portions which are hingedly connected to each other for pivotal movement relative to each other about a second pivot axis which is substantially parallel to said first pivot axis, one of said cover portions being joined to said main body.

2. A case for a substantially block-shaped camera having top and bottom walls, two side walls, a rear wall and a front wall formed with an objective, comprising, in combination, a main body having a bottom capable of covering the bottom wall and at least portions of the rear wall and of the two side walls, respectively; a front flap capable of covering at least a portion of the front wall and the objective formed thereat, said front flap being hingedly connected to said main body in the region of the front edge of the bottom thereof for pivotal movement about a first pivot axis which extends in the direction of said front edge; and a cover capable of covering the top wall and surrounding the upper end portions of the rear, front and side walls of the camera, said cover being composed of two cover portions and of hinge means for hingedly connecting said two cover portions to each other, at their contiguous edges, for pivotal movement relative to each other about a second pivot axis which is substantially parallel to said first pivot axis and which when said cover covers the top wall is substantially midway between the planes of the rear and front walls of the camera, one of said cover portions being joined to said main body.

3. A case as defined in claim 2, wherein said hinge means comprise a pair of elongated channel-shaped hinge members embracing, respectively, said contiguous edges of said cover portions and connected to each other for pivotal movement, one of said hinge members having a web portion located at the exterior of the case and overlying the juncture of said contiguous edges of said cover portions.

References Cited in the file of this patent

UNITED STATES PATENTS

| | | |
|---|---|---|
| 1,404,379 | Dahmen | Jan. 24, 1922 |
| 1,422,651 | Baxter | July 11, 1922 |
| 1,462,657 | Rainalter | July 24, 1923 |
| 2,172,348 | Githens et al. | Sept. 12, 1939 |
| 2,268,669 | Moore | Jan. 6, 1942 |
| 2,275,128 | Campbell | Mar. 3, 1942 |
| 2,505,848 | Barlow | May 2, 1950 |
| 2,705,989 | Gusmarino | Apr. 12, 1955 |